April 11, 1950  B. B. NELSON ET AL  2,503,917
COAL CONVEYER
Filed Oct. 7, 1946  2 Sheets-Sheet 1
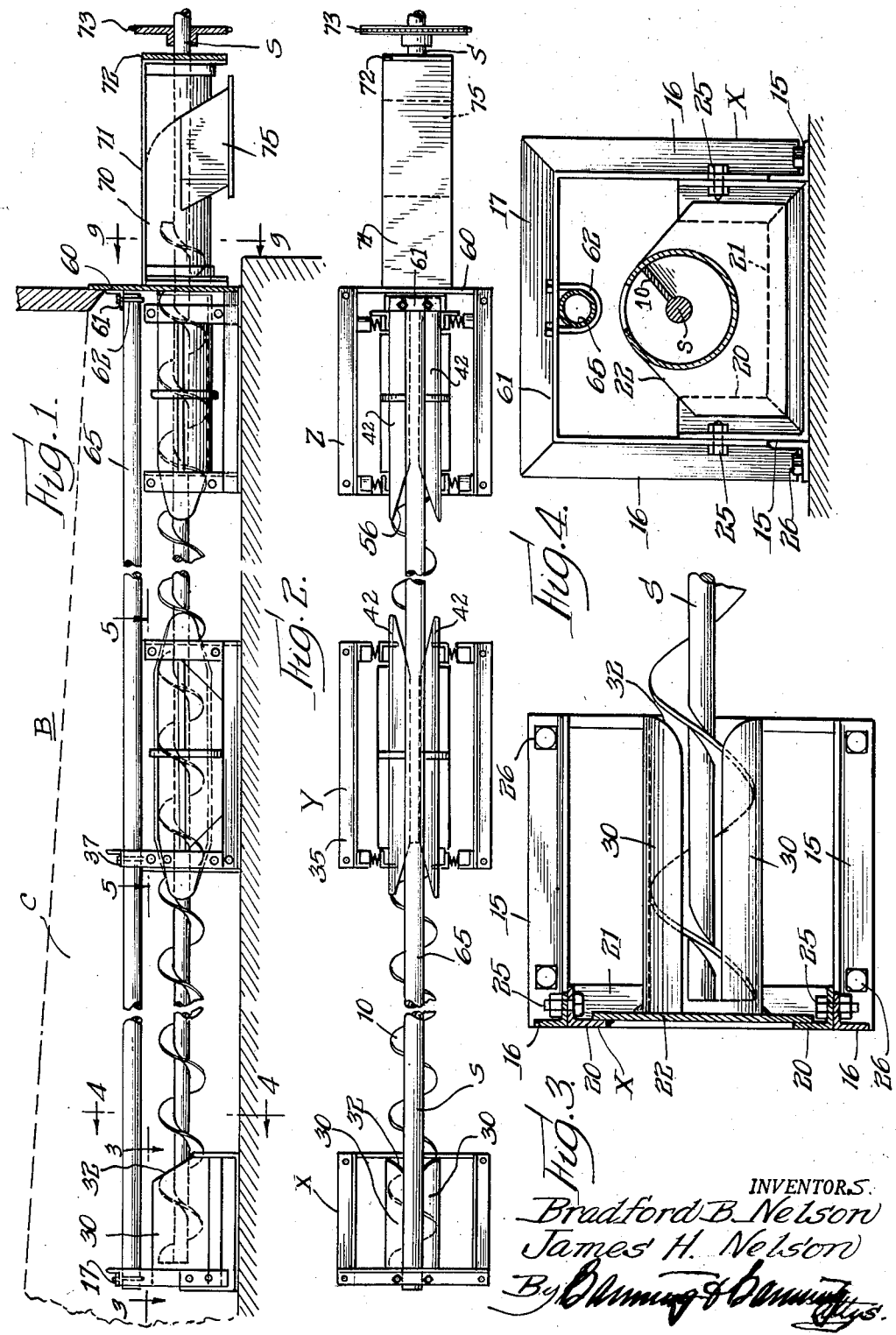
INVENTORS.
Bradford B. Nelson
James H. Nelson
By Clemming & Clemming
Attys.

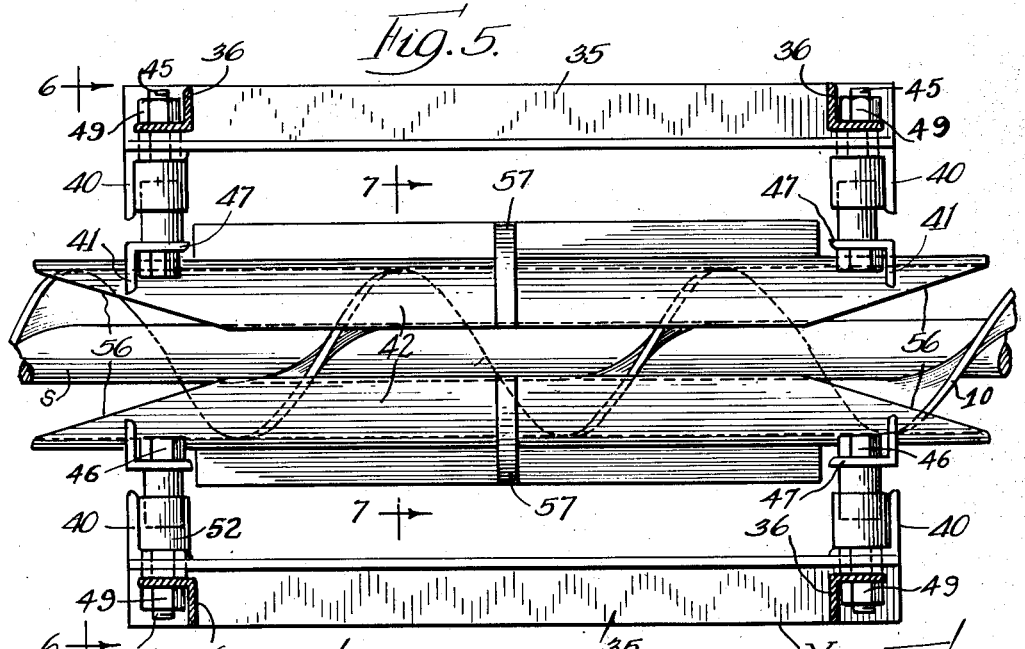

Patented Apr. 11, 1950

2,503,917

UNITED STATES PATENT OFFICE 2,503,917

COAL CONVEYER

Bradford B. Nelson and James H. Nelson, Ladoga, Ind.; said James H. Nelson assignor to said Bradford B. Nelson Application October 7, 1946, Serial No. 701,710

14 Claims. (Cl. 198—213)

This invention relates to an apparatus for moving coal or loose material that is capable of being operated upon by a spiral conveyor. It is adapted for use in many places such, for example, as in a bin from which coal is to be removed to another point. In the description to follow the invention will be considered as a conveyor for coal, which may be taken as one example of several materials of a loose, granular nature for which the present apparatus is particularly suitable.

It is an important object of this invention to provide a conveyor for coal and the like which will operate dependably over a long period of service. Frequently foreign or hard matter, or out-of-regular shapes, are encountered, tending to damage or wreck the mechanism. The apparatus herein disclosed is designed to meet such conditions by deflecting any such materials to one side where they remain clear of the conveyor. These, and other, objects and purposes of our invention are effectively attained by a construction such as the one herein illustrated by way of example, the drawings showing in Fig. 1, a vertical section through a conveyor which is installed at the base of a coal bin;

Fig. 2, a top plan view of the conveyor per se;

Fig. 3, a detail in horizontal section, taken on line 3—3 of Fig. 1;

Fig. 4, a transverse section taken on line 4—4 of Fig. 1;

Fig. 5, an enlarged detail in horizontal section, taken on line 5—5 of Fig. 1;

Figs. 6 and 7, transverse sections taken, respectively on lines 6—6 and 7—7 of Fig. 5;

Fig. 8, an enlarged detail in section, taken on line 8—8 of Fig. 6; and

Fig. 9, a transverse section on line 9—9 of Fig. 1.

We have shown a bin B having having a base or floor whereon is installed the conveyor mechanism presently to be described. A pile of coal C is adapted to be supported on the bin floor in surrounding relation to the conveyor. This conveyor comprises a plurality of aligned meter units X, Y, and Z, the first being positioned at the starting end, the second (one or more of them) at intermediate spaced points, and the last near the delivery end of the conveyor apparatus. Through the several meter units is extended a feed screw in the form of a shaft S mounting helical flights 10 adapted, when rotated, to advance the surrounding coal lengthwise of the conveyor.

The meter unit X at the starting end of the conveyor is best shown in Figs. 3 and 4. Here it will be noted we have provided on opposite sides of the shaft S a pair of angle base plates 15 from one end of which rises an inverted U-frame comprising vertical angle plates 16 supporting at the top a bridge plate 17. Within the U-frame is an inner frame, also desirably of angle iron pieces, comprising vertical bars 20 which rise from a horizontal base bar 21, an end wall plate 22 being secured, as by welding, to this inner frame to be supported thereby. The inner and outer frames present flanges of their respective angle irons in abutting relation to receive through them connecting bolts 25 whereby the two frames are fixedly secured in unitary relation. As by means of other bolts 26 which pass through flanges of the base plates 15, the entire meter unit may be secured fixedly to the base of the bin or other place where the conveyor is to be operated.

Extending lengthwise of the meter unit X is an arcuate guide 30 closely surrounding the helical flights 10. This guide which extends transversely through perhaps 330° is open at the top. At one end the guide may abut the wall plate 22 to which it may be secured as by welding; the opposite guide end is preferably inclined downwardly at 32 so as to afford at this point a wider opening for coal to move into contact with the revolving feed screw.

The intermediate meter unit (or units) Y may be formed with a somewhat similar framework (see Figs. 5–7) in that it comprises on opposite sides of the shaft S a pair of angle base plates 35 from opposite ends of which rise inverted U-frames each formed of vertical angle plates 36 supporting a top bridge plate 37. Within each angle frame is a pair of fixed angle bars 40, one associated with each angle plate 36, each bar affording a mounting for a web 41 (see Fig. 6) which is extended outwardly from an arcuate guide 42 extending transversely through perhaps 140° or so. The two guides which closely surround the helical flights 10 are spaced apart at top and bottom. A resilient connection between the framework of the meter unit and each guide 42 is provided in upper and lower bolts 45 (see Fig. 8) each having a head 46 in engagement with a flange 47 on the web 41, the shank of the bolt being extended through the flange 47 and angle plates 40 and 36, and through a pair of nuts 48 and 49, the former being immovably secured, as by welding 50, to the angle bar 40 with which it engages. Surrounding this bolt is a compression spring 51 extending between the angle bar 40 and the web flange 47 to exert opposite thrust forces thereupon, the spring being enclosed in one end region by an outer sleeve 53 which partially surrounds an inner sleeve 52 so as to be telescopically fitted thereto. The outer sleeve 53 may be affixed to the angle web flange 47, as by a weld connection 54, the inner sleeve 52 being held in abutting relation to the angle bar 40 as by means of an auxiliary coil spring 55 which is interposed between its free end and the web flange 47. By this construction, each web 41 is supported within the framework in such manner as to sustain its associated arcuate guide yieldingly toward the flights of the conveyor, the resilient telescopic connection between the web flanges 47 and the angle bars 40 being provided for this purpose. The distance of separation between the guides and the flights of the conveyor is very slight, perhaps 1/8", this being variable according to the axial position in which the bolts 45 are adjusted.

The two guides 42 are in complementary and cooperative relation in that the top opening between them diverges outwardly at opposite ends by the provision of inclined edges 56 which form gates. The angle of inclination is preferably substantially normal to the pitch of the flights 18. To reinforce these guides between their ends we provide plates 57 each having an arcuate formation edgewise conforming with that of the guides to one of which each plate is fixedly secured as by weld connections (see Fig. 7).

The meter unit Z which is proximate to the delivery end of the conveyor is generally similar to the one last described, and parts which correspond thereto have been designated by like reference characters. However, the guides 42 which are spring supported for cooperation with the flights of the screw conveyor are inclined at 56 at one end only (see Fig. 2), viz. the end toward which the advancing material is moving. At their opposite ends these two guides terminate adjacent a wall plate 60, having a suitable opening through which the screw conveyor is extended. Affixed to the wall plate 60 is a bracket plate 61 from which depends a U-bolt 62 which supports one end of a fixed tube 65 which is extended longitudinally of the conveyor substantially from end to end. This tube is supported intermediately as by U-bolts 62 each depending from one of the bridge plates 17 and 37 of a U-frame comprised in the meter units X and Y, respectively.

At a point beyond the wall plate, the screw conveyor is surrounded by a housing 70 in the form of a trough having an open top adapted to be closed by a cover plate 71. This housing is provided with an end wall 72 supporting, if desired, a bearing for the shaft S near its end where a sprocket wheel 73 may be affixed to be driven by a chain which is in connection with a power source (not shown). The bottom of the housing 70 is cut away to receive a depending spout 75 through which the coal may be gravity-discharged when advanced to substantially the end of the conveyor.

In operation, the coal pile will be moved lengthwise of the screw conveyor in response to rotation thereof. The coal lumps descending toward the tube 65 are deflected thereby to approach the helical flights from directions other than directly thereabove. This tube not only reenforces the conveyor structure and fixes the spacing of the several meter units relative to each other, but it prevents the weight of the coal above from bearing down excessively on the screw. As a result less power is required for operation.

When moving lengthwise of the conveyor, the coal lumps in approaching the meter units are guided somewhat by the gates. The effect of this is to deflect laterally to one side oversize or irregular lumps, and also foreign bodies as well, whereby they are prevented from remaining between the flights during their passage between the meter guides. It is found that the angle of the gates most effective for this purpose is substantially normal to the pitch of the flights. The lumps and bodies which are diverted away from the rotating flights tend to settle near the base of the bin laterally of the conveyor.

In the case of the intermediate units Y and also the unit Z, we provide a special mounting for the guides through which the screw conveyor is extended. These mountings comprise in each instance compression springs which maintain the guides resiliently toward the flights, but permit recession of the guides in response to an excess of pressure exerted outwardly from the coal which is being moved endwise of the conveyor. Because of the fact that the guides have capacity for yielding, no damage will result in case of an oversize or irregular lump or body being drawn into the guides in response to rotation of the conveyor screw. This safety feature will even permit the screw shaft to bend slightly, as required, so that oversize or irregular lumps or bodies may, on occasion, pass through and out of the guides instead of damaging or wrecking the meter unit.

If in operation the feed screw should encounter a mass of coal beyond its proper capacity, there will be a leveling off of the coal when the edges of the gate are engaged, whereby only a safe amount of the coal will be permitted to pass through the guides. Near the end of its movement, the coal is moved through the wall plate 60 and then on into the troughed outer end of the conveyor housing where it falls through the spout 75 for discharge at its new point of deposit.

We claim:

1. A conveyor for coal and the like in which is comprised a rotatable shaft mounting helical flights adapted, when engaged with surrounding loose material, to produce an advance thereof lengthwise of the shaft, a plurality of spaced meter units fixedly arranged endwise of the shaft, means interconnecting the meter units and extending lengthwise of the shaft above the flights thereof to divide the flow of material moving downwardly toward the shaft, and guides carried by certain of the meter units, each guide being open at the top and partially surrounding the flights of the shaft, and having its edges at the end facing the oncoming material extending divergingly at angles approximately normal to the pitch of the helical flights to deflect laterally therefrom lumps of material of excessive size or amount.

2. A conveyor for coal and the like in which is comprised a rotatable shaft mounting helical flights adapted, when engaged with surrounding loose material, to produce an advance thereof lengthwise of the shaft, a plurality of spaced meter units fixedly arranged endwise of the shaft, and guides carried by certain of the meter units, each guide being open at the top and partially surrounding the flights of the shaft, and having its edges at the end facing the oncoming material extending divergingly at angles approximately normal to the pitch of the helical flights to deflect laterally therefrom lumps of material of excessive size or amount.

3. A conveyor for coal and the like in which is comprised a rotatable shaft mounting helical flights adapted, when engaged with surrounding loose material, to produce an advance thereof lengthwise of the shaft, a plurality of spaced meter units fixedly arranged endwise of the shaft, means interconnecting the meter units and extending lengthwise of the shaft above the flights thereof to divide the flow of material moving downwardly toward the shaft, coacting guides carried by certain of the meter units, one guide to each side of the shaft flights and spaced apart from the other at the top, and resilient means supporting each guide in the meter unit yieldingly toward the shaft flights in a manner whereby it is free to move outwardly away from the shaft flights in response to a sufficient pressure therefrom, each guide having its edge at the end facing the oncoming material extending divergingly at angles approximately normal to the pitch of the helical flights to deflect laterally therefrom pieces of material excessive in amount or size.

4. A conveyor for coal and the like in which is comprised a rotatable shaft mounting helical flights adapted, when engaged with surrounding loose material, to produce an advance thereof lengthwise of the shaft, a plurality of spaced meter units fixedly arranged endwise of the shaft, coacting guides carried by certain of the meter units, one guide to each side of the shaft flights and spaced apart from the other at the top, and resilient means supporting each guide in the meter unit yieldingly toward the shaft flights in a manner whereby it is free to move outwardly away from the shaft flights in response to a sufficient pressure therefrom.

5. A conveyor for coal and the like in which is comprised a rotatable shaft mounting helical flights adapted, when engaged with surrounding loose materlal, to produce an advance thereof lengthwise of the shaft, a plurality of spaced apart pairs of guides adjacent the flights of the shaft disposed lengthwise thereof, and means extending parallel with the shaft interconnecting the guides at a point directly above the shaft for deflecting downwardly moving coal toward opposite sides of the shaft center.

6. A conveyor for coal and the like in which is comprised a rotatable shaft mounting helical flights adapted, when engaged with surrounding loose material, to produce an advance thereof lengthwise of the shaft, a meter unit comprising a pair of arcuate guides on opposite sides of the shaft vertically thereof, a web affixed to each guide exteriorly thereof and extending upwardly and downwardly therebeyond, a framework extending to the outside of each web, compression springs between the framework and each web arranged to exert opposing thrust forces thereon whereby to urge each guide toward the shaft, and means for limiting the distance of guide advance toward the shaft.

7. A conveyor for coal and the like in which is comprised a rotatable shaft mounting helical flights adapted, when engaged with surrounding loose material, to produce an advance thereof lengthwise of the shaft, and a meter unit having a pair of opposed guides on opposite sides of the shaft in closely spaced relation to the flights thereof, each guide being of arcuate form in cross section and provided exteriorly with a reenforcing web affixed thereto whereby to resist deformation from its arcuate contour.

8. A conveyor for coal and the like in which is comprised a rotatable shaft mounting helical flights adapted, when engaged with surrounding loose material, to produce an advance thereof, a meter unit comprising a pair of coacting guides on opposed sides of the shaft flights, and a framework wherein the guides are yieldingly supported for movement toward and from the shaft.

9. A conveyor for coal and the like in which is comprised a rotatable shaft mounting helical flights adapted, when engaged with surrounding loose material, to produce an advance thereof lengthwise of the shaft, a meter-guide assembly in operative relation to the shaft comprising a frame with a bridge overlying the shaft, and means extended lengthwise of the shaft over the flights thereof supportingly connected with the bridge for diverting downwardly moving coal toward opposite sides of the shaft center.

10. A conveyor for coal and the like in which is comprised a rotatable shaft mounting helical flights adapted, when engaged with surrounding loose material, to produce an advance thereof lengthwise of the shaft, a pair of guides disposed oppositely of each other upon opposite sides of the shaft, and a mounting for the guides comprising a framework therefor, and plural spring means extended from one side of the framework toward the other in connection therewith and with guides for yieldingly supporting the guides toward the flights of the shaft, and telescopic tubular means surrounding the springs supported by the guides and framework.

11. A conveyor for coal and the like in which is comprised a rotatable shaft mounting helical flights adapted, when engaged with surrounding loose material, to produce an advance thereof lengthwise of the shaft, a plurality of meter units fixedly arranged endwise of the shaft, the shaft being extended at one end beyond the endmost meter unit, a wall plate in the endmost meter unit having an opening through which the shaft is extended, and means extended longitudinally above the shaft in connection with each of the meter units and supported thereby adapted to divert downwardly moving coal toward opposite sides of the shaft center whereby to reduce the lateral pressure upon the shaft.

12. A conveyor for coal and the like in which is comprised a rotatable shaft mounting helical flights adapted, when engaged with surrounding loose material, to produce an advance thereof lengthwise of the shaft, a meter unit comprising a pair of guides in coacting relation with each other and with the shaft and spaced apart above and below the shaft, means extending lengthwise of the guides at a point medially thereabove for deflecting downwardly moving coal toward opposite sides of the shaft center, a framework extending fixedly along the outside of each guide, and a pair of compression springs, spaced apart in a vertical plane, each extending between the framework and one guide and exerting independently a thrust force against the latter such as to maintain it yieldingly toward the shaft.

13. A conveyor for coal and the like in which is comprised a rotatable shaft mounting helical flights adapted, when engaged with surrounding loose material, to produce an advance thereof lengthwise of the shaft, a meter unit comprising a pair of arcuate guides in confronting relation with each other and with the shaft therebetween and spaced apart above and below the shaft, a framework positioned to the outside of each guide, spring means extending between the framework and each guide arranged to maintain the latter yieldingly toward the shaft, and adjustable means for limiting the extent of movement of each guide toward the shaft.

14. A conveyor for coal and the like in which is comprised a rotatable shaft mounting helical flights adapted, when engaged with surrounding loose material, to produce an advance thereof lengthwise of the shaft; a pair of elongated arcuate guides in confronting relation with each other and with the shaft therebetween, and spaced apart above the shaft, and means extending lengthwise of the guides and therebeyond at a point directly above the spaced-apart guides for deflecting downwardly moving coal toward opposite sides of the shaft center.

BRADFORD B. NELSON.
JAMES H. NELSON.

REFERENCES CITED

The following references are of record in the file of this patent:

UNITED STATES PATENTS

| Number | Name | Date |
|---|---|---|
| 720,249 | Harrison | Feb. 10, 1903 |
| 1,811,064 | Raney et al. | June 23, 1931 |
| 2,031,116 | McBurney | Feb. 18, 1936 |
| 2,428,995 | Rogers | Oct. 14, 1947 |